United States Patent Office 2,788,958
Patented Apr. 16, 1957

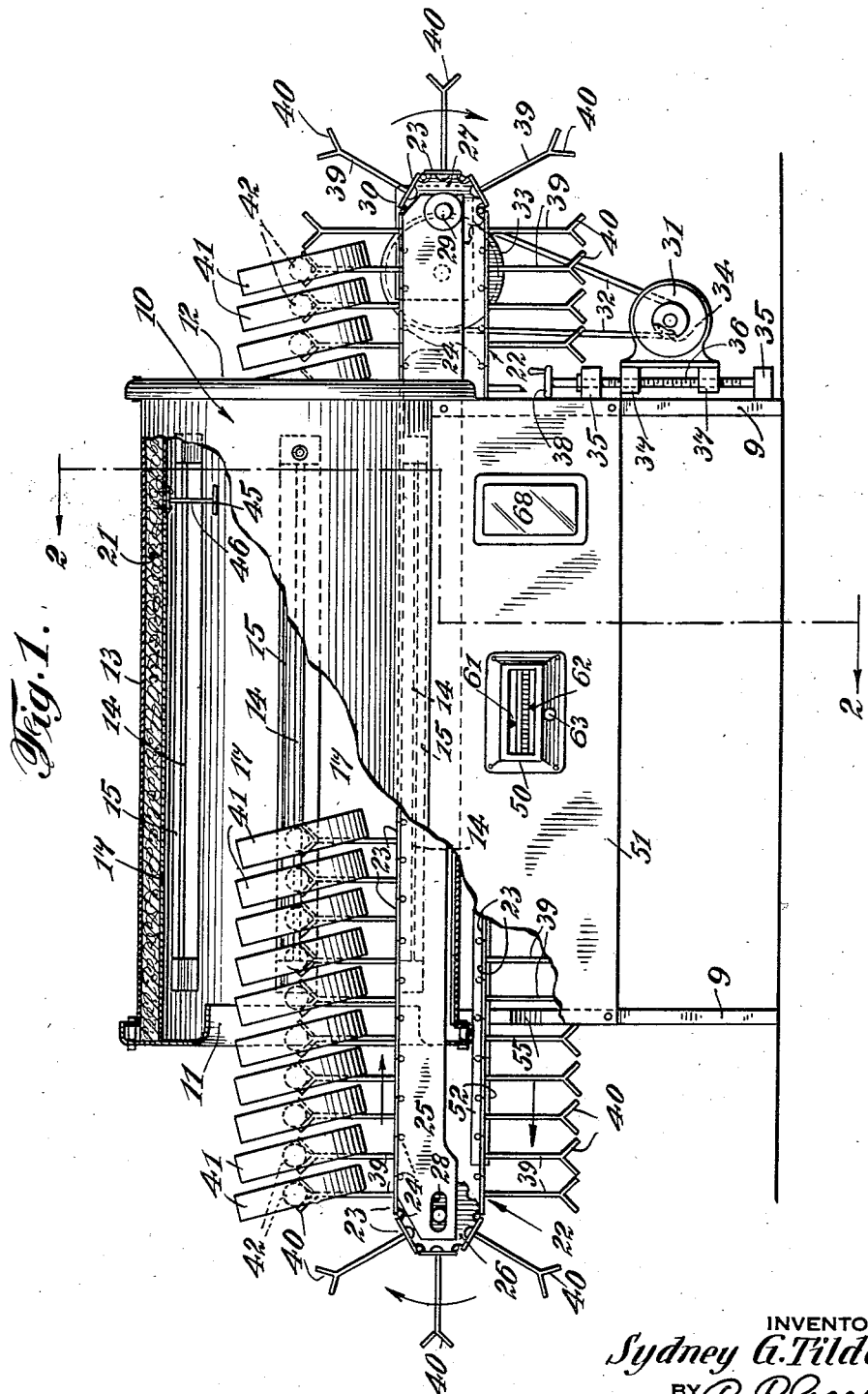

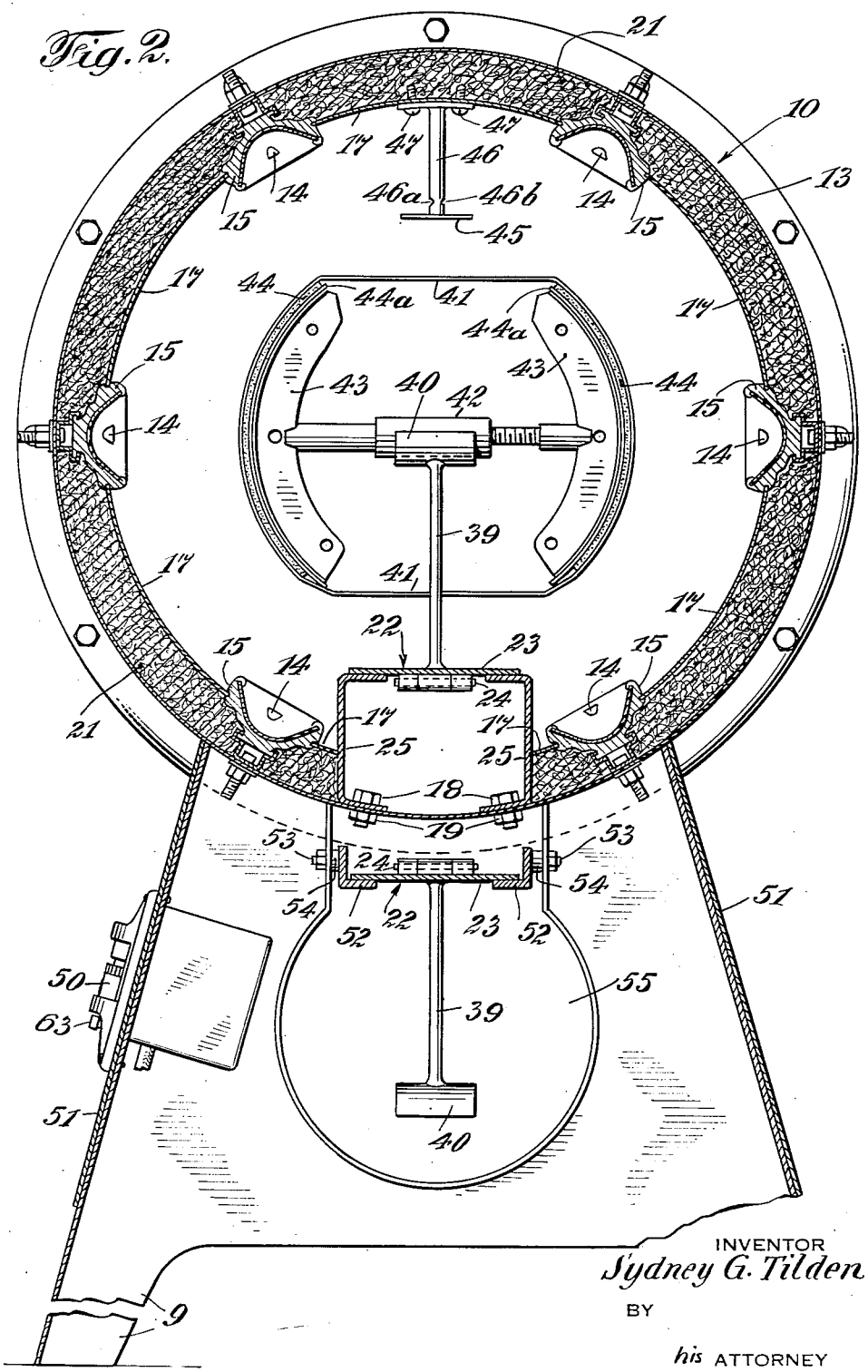

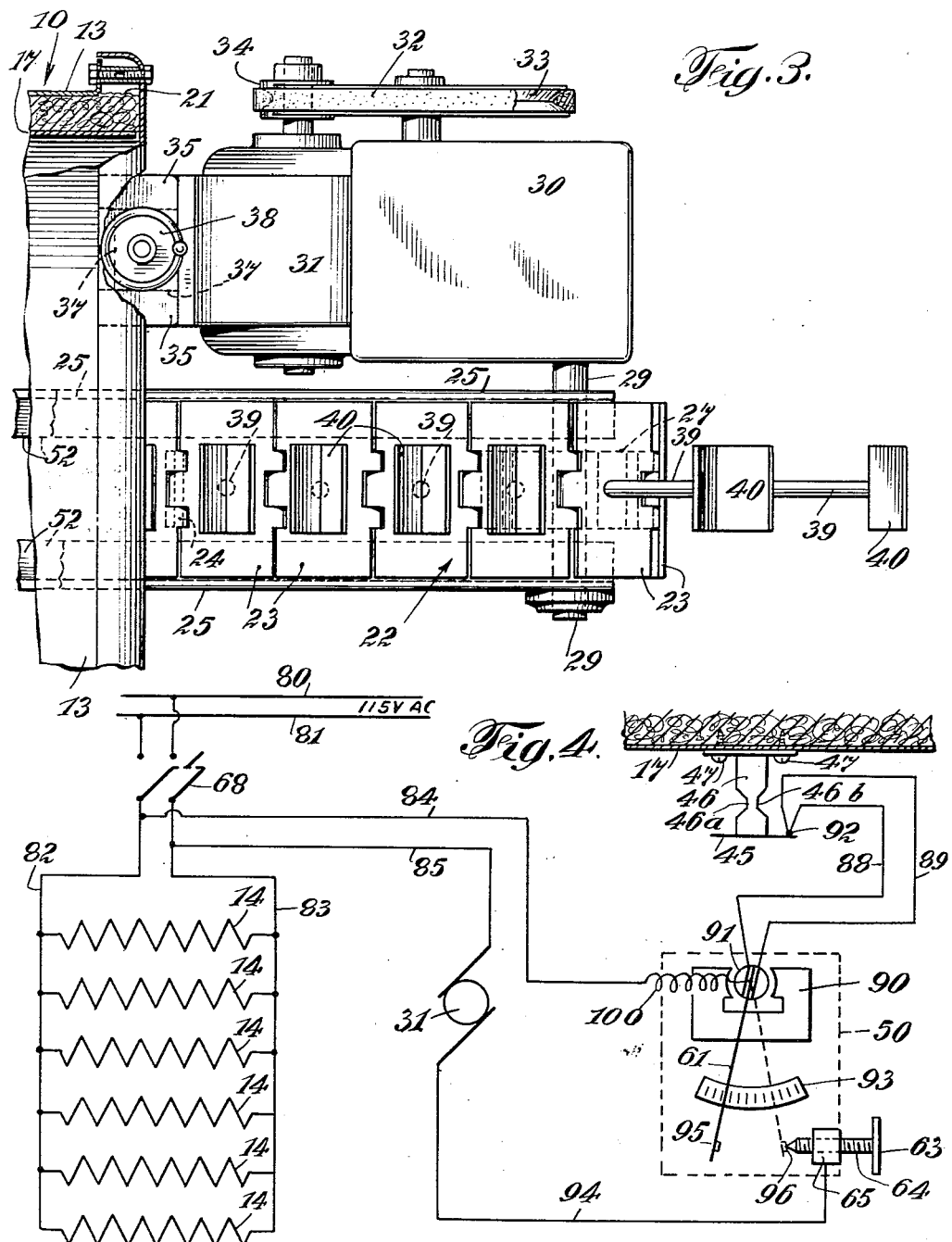

2,788,958

OVENS FOR BONDING BRAKE LINING FRICTION MATERIALS TO BRAKE SHOES

Sydney G. Tilden, Glen Cove, N. Y., assignor to The Permafuse Corp., Westbury, N. Y., a corporation of New York Application June 8, 1953, Serial No. 360,093

1 Claim. (Cl. 263—8)

This invention relates to conveyor ovens for bonding brake lining friction materials to brake shoes, and has for its object the improvement of the same. Previously known similar devices have employed a conveyor mechanism operating at constant speed and a thermostat within the oven to regulate the heating source and thus control the oven temperature and the temperature of the brake shoe assemblies. In this invention, on the other hand, the heating source is always operated at constant maximum output and the temperature of the brake shoe assemblies within the oven is controlled by regulating the movement of the conveyor, such movement continuing if the brake shoe assemblies within the oven reach proper bonding temperature before discharge, or stopping and holding the brake shoes under the heating source until they are up to proper bonding temperature before the conveyor is again started and the brake shoe assemblies discharged, the improvement including controlling such starting and stopping of the conveyor by means of a unique and novel sensing element and make-and-break pyrometer control.

In bonding brake lining to brake shoes, it is now common practice to clamp the two together under pressure with a layer of heat-hardenable adhesive between and subject the assembly to heat to cure and set the adhesive. Convection ovens, in which the air inside the oven is brought up to the desired temperature (usually around 400° F.) by means of electric resistance elements or gas burners, have been best suited for this purpose since close control of the oven temperature is possible by means of a thermostat to turn on and off the heat source. Many models and types of thermostats for oven temperature control are commercially available any of which will do a good job of maintaining within the oven the desired temperature. The assembled brake shoes, brake linings and interposed adhesive are placed within the oven and left for a predetermined period (usually thirty minutes) during which time the assembly is heated to near the oven ambient temperature and the adhesive cured and set.

The above described procedure has been most successful in securing uniform bonding temperatures and uniform bond strengths. However, in cases where large production of bonded brake shoes is required, such an oven does not lend itself to continuous production since it produces the completed shoe assemblies in batches depending on the oven capacity. In other words, an oven with a capacity of eight brake shoes at a time such as has been sold commercially by The Permafuse Corp., Garden City, N. Y., for the past six years, will produce 8 bonded brake shoes each thirty minutes, 16 shoes per hour and 128 per 8-hour day. If further production is required, a plurality of such oven units has been employed to produce the requirements of the particular shop.

It has been proposed to utilize radiant heat rays to raise the temperature of the brake shoe assemblies to the desired point since very fast heating is possible by concentrating the heat rays on the object to be heated. A number of ovens for brake shoe bonding employing electric radiant heat lamps have been designed, one by the applicant having been displayed and demonstrated at the Automotive Service Industries Show at the Navy Pier, Chicago, in December 1947. This oven employed two opposing batteries of infra-red lamps, each battery having sixteen lamps varying from 250 w. to 500 w. each. The brake shoe assemblies were passed between the two lamp batteries by means of an electric motor driven conveyor from which the shoes were suspended. It was found in actual use, that close control of the bond line temperature was impossible because of a number of variables, chief of which was the varying output of the infra-red lamps due to line voltage variations from day to day and from hour to hour during the day. The heat-output of such lamps varies as the square of the line voltage, thus even small changes in line voltage caused relatively large variations in the bond line temperature and resulted in some bonds being over-cured and others under-cured.

Other variables arising from the use of infra-red heat lamps were also not controlled nor compensated for, such as the tendency of the lamps to darken and give off less heat as they aged, the ambient temperature of the outside air which varied from day to day and from year to year (summer and winter) as much as 50° F.; the weight, size, and specific heat of the charge; and the initial temperature of the charge which also varied from day to day and from year to year as much as 50° F. All the above named variables affect the ultimate bond line temperature and the degree of cure of the adhesive.

It was then realized that an infra-red radiant heat oven would not be practical until means of compensation for and controlling these variables was accomplished.

It is the purpose of this invention to provide a radiant heat oven for the bonding of automotive brake shoes and brake linings by means of heat-hardenable adhesive that utilizes electric infra-red heat elements mounted within an oven enclosure and directed at the brake shoes, and a conveyor on which the brake shoes, assembled with brake linings and an interposed adhesive, are placed, the conveyor moving the brake shoes into the oven through an entrance end, passing by the radiant heat elements and out of the oven through an exit end, the movement of the conveyor being controlled by a sensing element located in the top portion of the oven enclosure and adjacent to the exit end which reacts to the temperature of the brake shoe assemblies as they pass under the sensing element, the sensing element being connected to a control which stops the conveyor if the shoes adjacent are below a pre-set temperature, and starts the conveyor when the shoes are up to the pre-set temperature.

It is also the purpose of this invention to provide an electric radiant heat oven for bonding brake shoes and linings, which is automatic in compensation for variations in line voltage; variations in the temperature of the air surrounding the oven; variations in the size, weight, mass and specific heat of the load; and variations in the initial temperature of the load.

The invention will be further described, embodiments thereof shown in the drawings, and the invention will be finally pointed out in the claim.

In the accompanying drawings,

Fig. 1 is a side view in partial section of the oven assembly, embodying the present invention;

Fig. 2 is a section through 2—2 of Fig. 1, in the direction of the arrows on the section line;

Fig. 3 is a top view of the conveyor drive mechanism at the exit end of the oven.

Fig. 4 is a wiring diagram showing the electrical connections.

Similar characters of reference indicate like parts through the various views.

Referring to Fig. 1, the improved oven is of horizontal tubular form and consists of an oven body 10, supported on legs 9 with side support members or aprons 51. The oven body 10 has attached thereto an open entrance end 11 and an open exit end 12. An outer shell 13 has at its inside surface, a plurality of electric infra-red heating elements 14. Between the heater bodies 15 are fitted the sheet metal segments 17 which, in place, form an inner shell as seen in Fig. 2. Insulating material 21 such as fibre-glass or asbestos wool, is packed between the inner shell segments 17 and outer shell 13 to reduce heat losses.

A conveyor chain 22, formed of flat rectangular links 23 connected by pins 24, slides on the ways 25 attached to the inner surface of the outer shell 13 at the bottom of the oven body 10 by means of the bolts 18 and nuts 19 (Fig. 2). At the ends of the ways 25 are sprockets 26 and 27 (Fig. 1). Sprocket 26, at the entrance end, is an idler and is movable in the elongated slot 28 for adjustment of the chain length. Referring to Fig. 3, sprocket 27, at the exit end, serves as the drive sprocket and is mounted on shaft 29 extending from gear reducer 30 of the proper gear ratio and is driven by electric motor 31 through the V belt 32 and pulleys 33 and 34. A means of adjusting the speed of the drive sprocket 27 (Fig. 1) is provided by mounting motor 31 in ways 35 having adjusting screw 36, nut 37 and crank 38 and a spring tensioned split pulley 34 forming a variable speed drive.

Returning again to Fig. 2, every other link 23 of the conveyor chain 22 has upwardly extending shoe mounting supports 39 which terminate in V-shaped seats 40 for holding the assembled brake shoes. A pair of brake shoes 43, brake linings 44 and the interposed adhesive 44a, are clamped against a flexible steel band 41 by means of a spreader jack 42, these elements forming a device as disclosed in Patent No. 2,358,483 issued to the applicant on September 19, 1944, and since widely used in the trade. The seats 40 are located so as to bring the spreader jack 42 of the assembled brake shoes in the longitudinal center of the oven as is shown particularly in Fig. 2. The left and right brake shoe of each assembly are therefore equi-distant from the heat elements regardless of their size and the size of the enclosing flexible band 41. The band 41 is treated so as to have a flat black surface permitting maximum absorption of the infra-red heat rays emanating from the heat elements 14 as well as permitting maximum exchange of heat between the bands and the inner shell segments 17, also treated so as to have a flat black surface. The legs 9 are provided with cut out space 55 to allow the return beneath the oven body 10 of support brackets 39 and 40, as shown in Fig. 2, and the conveyor 22 is supported on the return by the angles 52 which are attached to the legs 9 by bolts 53. Spacers 54 are provided to properly locate the angles 52 with respect to the conveyor 22 and the oven body 10.

Mounted below the top of the inner shell 17 and adjacent to the exit end 12 of the oven, is a sensing element 45 formed of a flat plate of thin sheet metal having a comparative low specific heat content, yet having a comparatively high heat conductivity, such as brass, having a thickness of between .008" and .012" and being approximately 1¾" square. The element 45 is treated so as to have a flat black surface and is supported from the sheet metal segment 17 by means of support 46 and screws 47. The support 46 is notched at 46a and 46b so as to restrict the flow of heat from the plate 45 to the sheet metal segment 17 and vice-versa, thus partially insulating the plate 45 from the supporting mechanism 46 and 17.

Referring to Fig. 4 the electric circuit is explained in more detail. A source of 115 volt alternating current is shown at 80 and 81 which is connected through master switch 68 to the heating elements 14 through lead wires 82 and 83. Lead wires 84 and 85 run from the master switch 68 to the conveyor motor 31, lead wire 84 being interrupted by the pyrometer control 50 indicated by dotted lines. The pyrometer control 50 consists of a millivoltmeter 90 having a rotating armature 91 to which is attached a pointer 61 formed of a metallic material such as silver, copper or aluminum having low electrical resistance operating over a calibrated scale 93, and an adjusting screw 63 having a threaded portion 64 and a nut 65 attached to the frame of pyrometer control 50. A contact point 95 is provided at the end of pointer 61 adapted to engage a contact point 96 on the end of adjusting screw 63 when the pointer swings counterclockwise to the position indicated by dash lines. Lead wire 94 runs from the adjusting screw 63 to the conveyor motor 31, and lead wire 84 is attached to the pointer 61 at its pivot by means of a pig tail 100.

To the surface of the sensing element 45 is attached a thermocouple 92 having lead wires 88 and 89 of iron-constantan, which wires run to the rotating armature 91 of the millivoltmeter 90.

By means of adjusting screw 63 a temperature setting may be selected so that when the temperature of the sensing element 45, as indicated by pointer 61 on scale 93, reaches the selected temperature, electrical contact is made between the contact point 95 on pointer 61 and the contact point 96 on adjusting screw 63. When the temperature of the sensing element 45, as indicated by pointer 61, falls below the selected temperature, electrical contact between the contact points 95 and 96 is broken. With points 95 and 96 in contact, the circuit to motor 31 is completed and motor 31 starts, causing the conveyor to move through the oven from left to right (Fig. 1) carrying the brake shoes and linings under the radiant heaters 14. When the temperature of the sensing element 45 becomes less than temperature set by the adjusting screw 63, contact points 95 and 96 open, the circuit is broken and motor 31 stops. With motor 31 stopped, the conveyor also stops and remains stopped until the temperature of the sensing element 45, under the influence of the brake shoes adjacent to it which are in turn being heated by the infra-red heating elements 14, again reaches the selected temperature as set by adjusting screw 63.

The action of the thermocouples in inducing an electromotive force in proportion to their temperature is well known in the art and requires no further explanation as is also the use of a millivoltmeter to indicate the extent of the electromotive force thus induced. The scale 93 may be calibrated so that the actual temperature of the thermocouple 93 and the sensing element 45 is indicated by the pointer 61. Adjusting screw 63 may be set so that an electrical circuit is completed through the pyrometer control 50 when the sensing element 45 reaches any desired temperature.

The pyrometer control 50 as described above, placed in series in the circuit to the motor 31 and directly controlling the motor, represents the simplest form of control and may be refined by the addition of a solenoid switch between the pyrometer control 50 and motor 31 so that only the comparatively small current necessary to operate a solenoid switch is passed through the pointer 61 and the contact points 95 and 96 and the much larger current required to operate motor 31 passes through the much heavier contact points of the solenoid switch. Further refinements are possible by replacing the millivoltmeter having mechanically actuated contact points 95 and 96 with a unit, which unit employs a light source directed at a photo electric cell with a light interrupting means on the indicating pointer to actuate an included solenoid switch through electronic amplifying tubes.

Such a device is a refinement of the simple means disclosed in this application, the means disclosed being considered sufficient to cover the principle of its operation.

The operation of the invention is as follows:

In bonding brake lining to brake shoes with the described oven device, the brake shoes are prepared in the usual manner, taking precautions to remove any grease, scale, rust or foreign matter from the bonding surface. The faying surface of the brake lining is then treated with a heat re-active adhesive agent in accordance with instructions supplied by the adhesive manufacturer which generally consists of applying one or more coats of adhesive either by means of a coater or by application by brush or spray or the use of adhesive in dry tape form.

After the brake shoes and lining segments have been prepared and are ready for bonding, a pair of brake shoes 43 and lining segments 44 are selected and are clamped against a flexible retaining ring with the adhesive 44a interposed by means of a screw spreader jack 42 (Fig. 2).

When the brake shoe assemblies have been so prepared, clamped up and are ready for bonding, the master switch 68 is placed in the "on" position and the brake assemblies are placed in the seats 40 of the shoe supports 39, as shown in Fig. 2. Only those supports which are outside of the oven at the entrance end are initially employed, the number of such supports depending upon the length of the conveyor between the entrance end 11, and the sprocket 26 and the distance between each shoe support 39. I have found that a distance of 3" between supports 39 permits bonding of brake shoes up to and including 3" wide, since the slight inclination of the assemblies as shown in Fig. 1 reduces the projected width to something less than 3" so that a ¼" diameter rod may be used to form the supports 39. A distance of 24" between the sprocket 26 and the entrance end 11 permits 8 shoe assemblies 3" apart to be placed exterior of the oven awaiting conveyance into the oven, which I have found is generally satisfactory to meet usual production needs and at the same time conserve shop space.

The pyrometer control 50 is set by means of the adjusting screw 63 to close contact points 95 and 96 at the desired bonding temperature. The bond line temperature for optimum strength of the adhesive agent is generally specified by each adhesive manufacturer and should be followed, the general range being between 375° F. and 425° F.

Assuming that the oven is "cold" when the master switch 68 is turned on, the conveyor will not operate since the temperature of the sensing element 45 will be that of the room ambient—say 70° F.—while the pyrometer control is set at, say 395° F. Thus the brake shoe assemblies outside of the oven at the entrance end will remain in situ until the oven and the sensing element 45, under the influence of the infra-red heating elements 14, get up to bonding temperature as set by the adjusting screw 63, at which moment contact is made between points 95 and 96 within the pyrometer control 50 which completes the circuit and starts motor 31 and conveyor 22. As the brake shoes progress into the oven, more assemblies can be placed on shoe supports 39 as they round the sprocket 26.

The speed of the conveyor 22 is adjusted by means of the crank 38 (Fig. 3), to the power output of the infra-red heating elements 14 so that a normal charge of small brake shoes, such as those used on the brakes of Chevrolet cars from 1939 to 1951, will just equal the pre-set bonding temperature as each assembly reaches the sensing element 45. I have found that, with a total input of 14.4 kw. to the heating elements which are 46¾" long, a conveyor speed of 4½" per minute will just permit sufficient time to raise temperature of the above described brake shoe assemblies from a room ambient temperature of 70° F. to a bonding temperature of 395° F. and will produce 180 brake shoes per hour.

As each brake shoe assembly approaches sensing element 45, there is an exchange of heat between the two by radiation which is facilitated by both having flat black exterior surfaces so that when each brake shoe assembly is directly under the sensing element, the brake shoe sensing element tends to assume the temperature of the brake shoe because of the very small heat capacity of the sensing element as compared to that of the brake shoe assembly. The instantaneous temperature of the sensing element is indicated by pointer 61 on the scale 93 of the pyrometer control 50 and thus indicates the temperature of each brake shoe assembly as it passes directly underneath the sensing element. Whenever the temperature of any brake shoe assembly as it passes underneath the sensing element 45 is less than the pre-set temperature as set by the adjusting screw 63 of the pyrometer control 50, power to the conveyor motor 31 is cut off, the conveyor stops and the brake shoe assemblies are held in place under the infra-red radiant heat elements 14 until the shoe assemblies are up to the pre-set bonding temperature, at which time electrical contact is made within the pyrometer control 50, the conveyor motor 31 starts and conveyor 22 proceeds through the oven discharging the brake shoe assemblies through exit end 12.

By this means of control, each brake shoe assembly is scanned by the sensing element 45 and if not up to the pre-selected bonding temperature, is held under the heating elements 14 until the pre-selected bonding temperature is reached before it is permitted to pass. Thus, control of the variables is automatically and completely achieved. If the line voltage to the heating elements drops below normal due to any cause, a longer than normal time will be required to heat the brake shoe assemblies to the pre-selected bonding temperature and thus the brake shoe assemblies will not be up to that temperature when they reach the sensing element. They are then stopped by the action of the sensing element on the pyrometer control which stops the conveyor motor and are held under the radiant heat elements until they are up to the pre-selected bonding temperature, at which time the sensing element so notifies the pyrometer control, the conveyor motor is started, and the conveyor continues until stopped again by successive brake shoes passing under the sensing element, which brake shoes are colder than the pre-selected temperature set on the pyrometer control.

Thus the variable of line voltage variation is completely controlled. Likewise the other variables, viz: variation in output of the heating elements with age; ambient temperature of the outside air; the weight, size and specific heat of the charge and its initial temperature; all are controlled by the action of the sensing element and pyrometer control over the movement of the conveyor. In this way no brake shoes can be discharged from the oven until they have reached the pre-selected bonding temperature. This significant fact carries the control system beyond the simple control of routine variables thus far discussed, it also impinges on the very safety of the entire operation by protecting the operation from even the most remote circumstances. Thus if for any reason one or more heating elements should become inoperative, the oven will not put out brake shoe assemblies that have not had sufficient cure. With the oven operating at such a reduced power, the brake shoe assemblies will remain adjacent to the sensing element until such time as they reach the pre-selected bonding temperature. If conditions of oven power ever become excessively poor, the brake shoe assemblies may never reach the pre-selected bonding temperature, in which case they become permanently stalled adjacent to the sensing element, and will not pass until the conditions are improved to allow sufficient temperature to allow passage.

Similar protection is provided against circumstances such as improper installation on an inadequate or improper voltage line, inadvertent or injudicious increase in conveyor speed, power failure on one phase of a three phase installation, and indeed any circumstance no matter how remote, is felt in the control system. Failure of the control system is its own protection. Any damage to it or to any of its component parts will immediately stop the conveyor.

This safety feature is a most important consideration and one which was not available in bonding ovens of the prior art. In such prior art ovens failure of a part in the heating system or in the control system could, unless noticed by an alert attendant, cause many brake shoe assemblies to be bonded with inadequate heat, causing improper bonds and subsequent failure of the part.

I have described several forms of my invention, but obviously various changes may be made in the details disclosed without departing from the spirit of the invention as set out in the following claim.

I claim:

In an elongated tubular oven for bonding brake lining friction material to brake shoes, said oven having an entrance opening at one end and an exit opening at the other end thereof, radiant heating means in said oven, a constant speed electric motor, a source of electric current for said motor, a conveyor including a first sprocket adjacent said entrance opening, a second sprocket adjacent said exit opening and an endless chain unidirectionally passing over said first sprocket, through said tubular oven, over said second sprocket and under said oven, an operative connection between one of said sprockets and said motor, spaced supporting members on said chain for brake shoes and brake lining friction material with said brake shoes and said brake lining friction material held together for bonding in said oven, and a flat plate sensing element located in the proximity of said exit opening in said oven and adjacent the path of said brake shoes and said brake lining friction material, the combination of a thermocouple mechanically connected with said sensing element, a galvanometer-pyrometer electrically connected with said thermocouple and having indicator means for visually representing the temperature of said sensing element, make-and-break contacts operatively connected with said indicator means between said source of electric current and said motor, and adjustable means connected with said make-and-break contacts for closing said contacts and operating said motor when said sensing element reaches a predetermined temperature of said brake shoes and said brake lining friction material, and for opening said contacts and disconnecting said motor when the temperature of said sensing element is below said predetermined temperature.

References Cited in the file of this patent

UNITED STATES PATENTS

| | | |
|---|---|---|
| 890,895 | Fery | June 16, 1908 |
| 1,474,903 | Hase | Nov. 20, 1923 |
| 1,776,823 | Summey | Sept. 30, 1930 |
| 1,808,241 | Martin | June 2, 1931 |
| 1,921,592 | Talley | Aug. 8, 1933 |
| 1,991,582 | Sterling | Feb. 19, 1935 |
| 2,089,029 | Jones | Aug. 3, 1937 |
| 2,273,126 | McGillin | Feb. 17, 1942 |
| 2,275,265 | Mead | Mar. 3, 1942 |
| 2,358,483 | Tilden | Sept. 19, 1944 |
| 2,504,516 | Goodell | Apr. 18, 1950 |